United States Patent [19]

VanCleave

[11] 4,192,766

[45] Mar. 11, 1980

[54] COMPOSITION FOR DECREASING WATER RESISTANCE TO MOVEMENT

[75] Inventor: Jon S. VanCleave, West Des Moines, Iowa

[73] Assignee: United Chemical Corporation, Des Moines, Iowa

[21] Appl. No.: 850,736

[22] Filed: Nov. 11, 1977

Related U.S. Application Data

[62] Division of Ser. No. 571,610, Apr. 25, 1975, Pat. No. 4,073,983.

[51] Int. Cl.$^2$ .................... C08L 91/00; C09K 3/30
[52] U.S. Cl. .................................. 252/305; 106/243
[58] Field of Search ............... 252/305, 350, 357; 106/287 R, 243; 424/73

[56] References Cited

U.S. PATENT DOCUMENTS

| | | | |
|---|---|---|---|
| 3,014,844 | 12/1961 | Thiel et al. | 252/305 |
| 3,715,942 | 2/1973 | Courtney | 424/73 |

*Primary Examiner*—Theodore Morris
*Attorney, Agent, or Firm*—Zarley, McKee, Thomte, Voorhees & Sease

[57] ABSTRACT

A method and composition for decreasing water resistance to movement by decreasing the surface tension and diminishing the contact angle between an object moving through water, and the water, and/or between water passing over an object and the object, thereby allowing the object to move at an increased speed with the same applied moving force or at the usual speed with less applied moving force. The method is accomplished by applying to the surface of the object which is to be moved through water a thin layer of a non-ionic surface active agent which is water insoluble with the agent having a hydrophile-lipophile balance of about 7 to about 9.

7 Claims, No Drawings

COMPOSITION FOR DECREASING WATER RESISTANCE TO MOVEMENT

CROSS REFERENCE TO A RELATED APPLICATION

This application is a division of application Ser. No. 571,610, filed Apr. 25, 1975 now U.S. Pat. No. 4,073,983 issued Feb. 14, 1978.

BACKGROUND OF THE INVENTION

In certain sports, recreational activities, industry, aviation and the like, it is desirable for a man or object to be moved through the water or for water to pass over an object as fast as possible and with the greatest efficiency possible. Thus, in the above fields, taking sports as an example, one of the objectives is to move an object through water at a maximal obtainable speed for a given applied moving force.

Whenever an object, projectile, person, or any other thing is moved through water there are certain well known physical and chemical forces which come into operation. For example, there is a drag or resistance to movement at the surface of the juncture between the solid and liquid phases. This "drag" or counterproductive force against movement is a measurable physical phenomenon and is a function of the surface tension of the liquid, the force of gravity, the degree of imbibition, the adhesive force between liquid molecules and the solid phase, and the contact angles involved at the interface.

These interfacial phenomena are known in the art. However, not realized before in a manner suitable for useful application is the fact that, by thermodynamically causing a reduction in the surface tension and the contact angles involved between the liquid and solid phases, the resistance or drag to movement of an object through water can be decreased. Moreover, while having the knowledge that it is theoretically possible to reduce the surface tension and the contact angle between a solid projectile and a liquid at the interface between the solid and the liquid is one matter, putting that theoretical information into practical use in the aforementioned areas is still another.

For example, one might predict that some of the most useful surface active agents would have a high degree of hydrophilic activity. This generally would mean the water soluble surface active agents. While theoretically such agents should work to reduce the previously mentioned surface tension, it has been found as a practical matter that a water soluble surface active agent is undesirable for the following reasons: If the surface active agent is water soluble, and once the moving solid projectile with the agent applied begins its course through water, the surface active agent immediately begins to solubilize and in short order is totally washed away. This obviously shortens the useful life of the agent which is intended for use during the entire duration of the sporting event or other process. Hence, this necessitates continuous reapplication of the agent if the process or event is of any length in time at all. And, in the case of events which proceed without interruption once commenced means the agent is of little or no value.

On the other hand, certain highly insoluble agents do not appear to solve the problem either. Thus, certain so-called hydrophobic, lipophilic agents may, depending on the agent, actually increase the contact angles involved at the interface and thereby defeat two of the major objectives of the invention, i.e. to reduce water resistance to movement through water.

Accordingly, while the (thermodynamic) knowledge of such fluid dynamics has long existed, the interpretation of that knowledge and the development of an efficiently practical surface application composition which can be conveniently applied to the surface of an object with the intention of aiding that object's movement through a water medium in the shortest time possible, has not heretofore been accomplished. A few examples of suitable activities in which a decrease in both surface tension and contact angle is important include: swimming, sail boat racing, hydroplaning, speed boat racing, water polo, surf boarding, light aircraft flying in rainy weather, golfing on a wet course, and many other activities.

Accordingly, one object of this invention is to provide a method of decreasing the water resistance to movement, thereby allowing the object to move at an increased speed with a constant applied moving force or at the usual speed with less applied moving force.

Another object of this invention is to provide a composition which can be applied to the surface of a solid projectile which is to be moved through water in order to decrease surface tension and the contact angle involved and yet have a composition which is not easily removable upon contact with the water in order to provide for the above effects for extended periods of time.

Yet another object of this invention is to provide an aerosol spray-type composition for the application of the composition of this invention so that the composition can be applied evenly in a micro thin layer in a convenient and efficient manner.

The method of accomplishing these and other objects of the invention will become apparent from the following detailed description of the invention.

DETAILED DESCRIPTION OF THE INVENTION

One measurable phenomenon which is utilized to describe the relationship between a liquid and a solid at the interface between the two is the contact angle. The contact angle is a measure of the spreading of the liquid over the solid surface. When the contact angle is small, a drop of the liquid is flat and covers a greater area of the solid than when the contact angle is large. When the contact angle is equal to zero, the liquid covers the whole solid surface accessible to it. Surface active compounds which can be utilized in the compositions of this invention must be those compounds which decrease the contact angle at the interface between a liquid and a solid surface.

Surface active agents useful in the method and composition of this invention are those having the following characteristics: (1) The surface active agent must decrease the contact angle between a solid and a liquid at their interface; (2) the surface active agent must be water insoluble; (3) the surface active agent must lower the surface tension of the aqueous medium; (4) the surface active agent must be a nonionic surface active agent; (5) the surface active agent must have a hydrophile-lipophile balance, hereinafter referred to as HLB of from about 7 to about 9.

Only those relatively few surface agent compounds meeting the above criteria are capable of use in the method and composition of this invention in order to provide a practical and noticeable increase in speed of a projectile or object moving through water (or increase in speed of water passing over an object) at a constant applied moving force or at the usual speed with less applied moving force when compared with the same object under the same conditions without having the composition of this invention present. It is important that the surface active agent decrease the contact angle to facilitate the wetting of the solid object when immersed in an aqueous liquid. In other words, the agent should favor the replacement of a solid-air interface by a solid-liquid interface. Such an agent is termed in the art a "wetting" agent. It is important that the surface active agent be a water insoluble surface active agent because as heretofore mentioned, while some water soluble surface active agents may meet all of the other criteria mentioned herein, those which are water soluble will have no lasting effect upon the performance of an object moving through water since the solubility of the surface active agent will mean that it is soon washed away and therefore any beneficial effect short-lived. The result will be simply an initial wetting of the interface of the solid and the liquid coupled with an initial decrease of surface tension followed by solubilization of the surface active agent and its subsequent rinsing away with the result being no noticeable effect over a prolonged time period. Many of the agents mentioned hereinafter are water insoluble but are also water dispersible even though they are insoluble. As used herein, dispersible is used to mean insoluble but capable of being self emulsified and on standing will separate into layers.

The more viscous the insoluble agent is, the slower the agent will disperse in, or tend to be "worn away" by, the force of the flow of water over the object on which the agent is applied. Hence, water insolubility coupled with a preferred relatively high viscosity will permit the agent to remain at the desired application site for the duration of its intended action.

It is important that the surface active agent be a nonionic surface active agent because surface active agents in the other major categories, i.e., the anionic surface active agents, the cationic surface active agents, and the ampholytic surface active agents, have been found not suitable. Anionic surface active agents will chemically bind cations, such as calcium and magnesium, present in hard water with the result being the formation of undesirable complexes at the interface of the solid and the liquid. As a result, not only will there tend to be an undesirable build up of these complexes, there may tend to be an inactivation of the surface active agent—all of which may cause an increase in the interfacial surface tension. Cationic surface active agents are unsuitable for the process of this invention since cationic agents increase the contact angle rather than decrease it with the result being that the cationic agents also have a tendency to increase the surface tension. Ampholytic surface active agents are inappropriate for use herein because: as is well known, depending upon the pH of the environment in which they are being used, ampholytic surface active agents tend to exhibit either the characteristics of an anionic surface active agent or a cationic surface active agent, and both are undesirable for use in the method and composition of this invention.

Finally, it is important to this invention that the surface active agent have an HLB of from about 7 to about 9. HLB, as is well known to those skilled in the art, refers to the hydrophile-lipophile balance of a surface active agent, i.e., the balance of the size and strength of the hydrophilic (water-loving or polar) and the lipophilic (oil-loving or non-polar) groups of the agent. Thus, it generally is an arbitrary measure of the relative magnitudes of the polar and non-polar portions of a surface active molecule. Such a relationship greatly influences the molecule and its use. The HLB is in fact an arbitrary scale of values used as a measure of the hydrophilic-lipophilic balance of a given surfactant. The higher the HLB of a surfactant, the more hydrophilic the agent. Typical HLB values can range from as low as a reported value of 1.8 for sorbitan trioleate up to as high as 40 for sodium lauryl sulfate. Only surface active agents having an HLB of from about 7 to about 9 are usable in the method and composition of this invention. The choice of the HLB range for this composition is directly related to the desired effect on the aforementioned contact angle which is an important factor in obtaining the composition's desired effect. It was noted earlier that it was necessary to decrease the contact angle as effectively as possible and such agents which do this are called wetting agents. However, for a surfactant to be an effective wetting agent, two criteria must be fulfilled: The surfactant must (1) concentrate at the solid-liquid interface, thus reducing the liquid-solid interfacial tension and the liquid-solid contact angle and (2) diffuse rapidly to the solid-liquid interface from the bulk of the liquid. While most synthetic surfactants fulfill the first requirement, their high molecular weight and low critical micelle concentraion often prevent their meeting the requirement of rapid diffusibility. The critical micelle concentration is the term used to refer to that concentration of surfactant at which micelles begin to form. When such a concentration is reached (it is usually in the range of about 0.05 to about 1.10% for most surfactants), the surface tension of a liquid ceases to fall any farther. Thus, by experience it has been found an effective wetting agent should have an HLB falling in the narrow range of about 7 to about 9.

There are surprisingly few surface active agents which meet, in themselves, all of the criteria previously discussed herein. Those which do can generally be classified as surface active agents which contain an ester or ether linkage at some position within the molecule. Examples include sorbitan fatty acid esters, polyoxyethylene sorbitol ethers, one known polyoxyethylene alcohol, and certain other miscellaneous compounds. Furthermore, the following surfactant classes among others have members of which some can be theoretically blended experimentally in various combinations to arrive at the desired HLB of this invention: sorbitan fatty acid esters, polyoxyethylene sorbitol esters, polyoxyethylene alcohols, and mixed fatty acid ester blends. It is therefore to be understood that this invention contemplates mixtures of surface active agents, with the mixture meeting the previously defined criteria for acceptability for use herein.

In particular, those single surface active agents which are known to be useful in the method and composition of this invention include the following: Sorbitan monolaurate which has an HLB of 8.6±1 HLB, and a viscosity at 25° C. of 3,000 cs. and is water insoluble at 25° C. This compound is sold by ICI America, Inc. under the trademark Arlacel 20. Another suitable sorbitan fatty acid ester is sorbitan monolaurate having an HLB of 8.6±1 HLB and a viscosity of 4,250 cs. which also is insoluble in water at 25° C. and sold by ICI America, Inc. under the trademark Span 20.

Suitable polyoxyethylene sorbitol esters for use in the method and composition of this invention include polyoxyethylene sorbitol oleate having an HLB of 9.2±1 HLB and a viscosity at 25° C. of 1800 cs. which is insoluble in water at 25° C. and is sold by ICI America, Inc. under the trademark Atlox 1087. Another compound falling into this category is polyoxyethylene sorbitol tall oil having an HLB of 9.7±1 HLB, a viscosity of 900 cs., an insolubility in water at 25° C., and was sold by ICI America, Inc. under the trademark Atlox 1256. Still another compound suitable for use herein falling into the general category of polyoxyethylene sorbitol esters is a polyoxyethylene sorbitol ester of mixed fatty and resin acids having an HLB of 8.6±1 HLB, and a viscosity at 25° C. of 1900 cs. and is likewise insoluble in water at 25° C. This compound was sold by ICI America, Inc. under the trademark G-1234. Yet another compound falling into the class of polyoxyethylene sorbitol esters suitable for use in this invention is polyoxyethylene sorbitol tallow esters having an HLB of 9.6±1 HLB, a pour point of 18° C., and was sold by ICI America, Inc., under the trademark G-3284.

The only polyoxyethylene alcohol presently known to be usable in the process and composition of this invention is polyoxyethylene (4) lauryl ether having an HLB of 9.7±1 HLB and a viscosity at 25° C. of 35 cs. This compound is water insoluble at 25° C. and is sold by ICI America, Inc. under the trademark Brij 30. Two additional surfactants sold by ICI America, Inc. in the past, but no longer available from them but utilizable herein are polyoxyethylene mannitol dioleate, having an HLB of 8.0±1 HLB and trademarked G-2800 and sorbitan monoleate polyoxyethylene ester mixed fatty and resin acids blend having an HLB of 7.8±1 HLB, a viscosity at 25° C. of 500 cs., and being water insoluble at 25° C. is trademarked G-2684. For further details with regard to each of the compounds mentioned herein see ICI America, Inc. publication O-1 (LG-60) entitled "General Characteristics of Atlas ® Surfactants" at pages 1 through 9 and publication LD-97 of the same company entitled "The Atlas HLB System" at pages 16 through 17 which are specifically incorporated herein by reference.

As can be seen from the above information, HLB is calculated to a statistically significant accuracy of ±1. Thus for example an HLB of 9.7±1 falls within the terminology of from about 7 to about 9 as that term is used herein.

The compounds having the criteria previously discussed herein are compounds more viscous than water. For purposes and reasons mentioned earlier, it is desirable and therefore preferred for the product to be as viscous as possible to permit the product to remain on the object to which it is applied as long as possible. The time the water insoluble agent remains on the object is directly proportional to the viscosity. In other words, the longest lasting agent for the intended purpose of the composition is that which is most viscous.

Only a low concentration of a surfactant at the solid-liquid interface is necessary. This concentration is in the range of from about 0.05% to about 0.10% for most surfactants because, at concentrations greater than this, micelles begin to form since the surfactant molecules can no longer be absorbed at the interface. As a result, surface tension of the liquid ceases to fall any farther and, in fact, then tends to increase. One highly preferred manner of insuring the desired low concentrations of the surfactant previously specified herein is aerosol application. Aerosol application is important for several reasons.

Economics: Obviously applying more than the critical micelle concentration is unnecessary and therefore wasteful. Hand application methods of such a surfactant would nearly always permit the tendency of the user to waste the agent by virtue of the inadequacy of the technique to achieve a microfilm layer application of the agent.

Convenience: It is, by far, easier to spray a microfilm layer of the agent on the solid surface than to apply it in any other manner.

Practicality: (a) It is the only way to conveniently obtain a microthin layer which is evenly spread; the uniform, even spreading being important to ensure complete coverage yet disallow excessive build-up of the product; (b) one is able to vary the layer's thickness to jointly meet both the critical micelle concentration and the requirements of maintaining an approximate later thickness which will last the duration of the time it is needed. In other words, different tasks require different amounts of time to perform them and therefore require accordingly different layer thicknesses to last the specific time needed—yet still have a layer not exceeding the critical micelle concentration. For example, a competitive swimmer entered in four races will require a somewhat thicker coating than a competitive swimmer entered in only one event. Practically, this can only be expediently accomplished in one application by aerosol means and negates constant re-application unless so desired.

Fluid mechanics: The critical micelle concentration has already been discussed. However, it should furthermore be noted that, in general, micelle formation causes a loss of effective surface activity, especially if the adsorption of the surface active agent is a simple amphipathic one. Moreover, it is to be noted that most surfactants useful in the compositions of this invention tend to be of a viscous nature. Hence, if these agents or any agent of a viscosity substantially greater than water were to be applied in any other manner than by aerosol application, too thick of a coating of the surface active agent would tend to result, thus hindering the effectiveness of the composition whenever the previously discussed concentrations were exceeded. Thus, an aerosol, by its inherent nature, allows a much more accurate approximation of the desired surface concentration and thickness of the agent to be applied to the surface of an object than other means such as hand application. Therefore, it is this obtainment of a more accurate approximation of the desired coating thickness and concentration by aerosol means which helps prevent excessive and therefore detrimental build-up of the surface active agent.

In accord with the invention, a composition is made which comprises from about 5% to about 20% by weight of the surface active agent and from about 80% to about 95% by weight of an aerosol liquid propellant. Preferably the mixture comprises from about 9% to about 15% by weight of the surface active compound and correspondinly from about 85% to about 91% by weight of the liquid propellant.

Suitable liquid propellants for use herein have been found in the nonflammable liquid propellant halogenated hydrocarbons and include monochlorotrifluoro methane, dichlorodifluoro methane, and the like. Of the halogenated hydrocarbons the most preferred are the fluorinated and chlorinated hydrocarbons, with the preferred hydrocarbon being methane.

It is also possible to employ straight chain hydrocarbon propellants for the composition of this invention which generally comprise lower straight chain hydrocarbons selected from the group consisting of propane, butane, and isobutane. These may be utilized singly or in mixtures and, if desired, may be combined with fluorinated and chlorinated hydrocarbons. For example, in one highly preferred composition, the product comprised 10% by weight of the surface active agent, 40.5% by weight of the dichlorodifluoro methane, 40.5% by weight of monochlorotrifluoro methane, and 9% by weight of isobutane. The aerosol system was compressed in a conventional aerosol can to a pressure of from about 37 to about 40 psig.

Of course, the precise pressure of the pressurized liquid propellant and surface active agent composition will vary but generally it will be within the range of from about 25 psig to about 40 psig with 37 psig to 40 psig being preferred.

Utilization of the propellant compositions sufficiently dilutes the surface active agent to allow its application to a solid surface in the nature of a relatively uniform microthin film layer to achieve the purpose of the composition. Generally, the thickness of the microthin film layer of the surface active agent as applied by the aerosol liquid propellant system composition herein described should be from about 1.0 millimicrons to about 3.0 millimicrons and preferably from 1.0 millimicrons to 1.5 millimicrons.

Of course, the spray pattern of the composition so allows the above desired film layer thicknesses to be applied yet allows layers several times the stated thicknesses to be applied, if so desired and yet maintains a layer thickness below that compatible with the critical micelle concentration.

The following example is offered to further illustrate but not limit the invention described herein.

A composition of this invention was prepared as an aerosol preparation. The formulation was as follows:

|  | % by weight |
|---|---|
| Sorbitan monolaurate (nonionic, HLB 8.6 ± viscosity 4230 cs., insol. H$_2$O at 25° C. sold under Atlas trademark Span 20) | 10% |
| monochlorotrifluoromethane | 40.5% |
| dichlorotrifluoromethane | 40.5% |
| isobutane | 9% |

The formulation was compressed in a conventional aerosol can to a pressure of from about 37 psig to about 40 psig.

The formulation was used by a high school swimming team in actual competitive swimming and the swimmers' times were compared with their times in another meet during which the composition of the present invention was not employed.

The following is data accumulated by a swim coach who with his team participated in a clinical trial of the invention during their performance at the state swim meet. The data is interpreted and compared with the times earned by the same swimmers in a district meet one week earlier in which the formulation of the invention was not used. All times have been rounded back to the nearest tenth of a second from hundredths of a second.

TABLE

|  | Swimmer | (w/o inv.) District | (w/ inv.) State | + Seconds |
|---|---|---|---|---|
| 200 yd. medley relay | A | 29.3 | 28.4 | −0.9 |
|  | B | 29.1 | 28.8 | −0.3 |
|  | C | 26.2 | 25.6 | −0.6 |
|  | D | 23.2 | 23.0 | −0.2 |
| Totals |  | 107.8 | 105.8 | −2.0 |
| 400 yd. free style relay | C | 53.0 | 53.0 | −0.0 |
|  | E | 53.1 | 52.5 | −0.6 |
|  | F | 54.5 | 54.3 | −0.2 |
|  | D | 52.8 | 51.5 | −1.3 |
|  |  | 213.4 | 211.3 | −2.1 |
| 200 yd. indiv. medley | B | 28.2 | 28.0 | −0.2 |
|  |  | 34.2 | 34.8 | +0.6 |
|  |  | 37.4 | 37.2 | −0.2 |
|  |  | 29.8 | 29.4 | −0.4 |
|  |  | 129.6 | 129.3 | −0.2 |
|  | E | 28.8 | 28.4 | −0.4 |
|  |  | 36.2 | 36.5 | +0.3 |
|  |  | 38.6 | 38.9 | +0.3 |
|  |  | 31.3 | 30.7 | −0.6 |
|  |  | 134.9 | 134.5 | −0.4 |
| 50 yd. free style | D | 23.7 | 23.7 | −0.0 |
| 100 yd. butterfly | C | 27.3 | 27.0 | −0.3 |
|  |  | 33.0 | 31.5 | −1.5 |
|  |  | 60.3 | 58.5 | −1.8 |
| 100 yd. backstroke | A | 28.7 | 28.3 | −0.4 |
|  |  | 32.2 | 32.3 | +0.1 |
|  |  | 60.9 | 60.6 | −0.3 |
| 100 yd. breast stroke | F | 31.3 | 31.3 | −0.0 |
|  |  | 37.3 | 36.2 | −1.1 |
|  |  | 68.6 | 67.5 | −1.1 |
|  | B | 30.6 | 30.2 | −0.4 |
|  |  | 35.3 | 34.5 | −0.8 |
|  |  | 65.9 | 64.7 | −1.2 |

Averaging of above data (1) The average decrease in time for individual performances including those within the Medley Relays was: 0.61 seconds.

(2) The average decrease in time for individual performances excluding Medley Relay performances was: 0.83 seconds.

(3) The average decrease in time for the Medley Relay performances was 2.0 seconds.

(4) The average decrease in time per event was: 1.0 seconds.

The aerosol spray formulation of the invention was sprayed lightly over the swimmers' bodies by the inventor. It is believed that in nearly all cases the film thickness employed was within the range of from about 1.0 to about 3.0 millimicrons.

The swim coach commented that the swimmers generally felt that they didn't "feel faster" as they swam but claimed that the fatigue that usually came in the later stages of their race was either not noticed or considerably less than usual. The coach's conclusion was that the formulation allowed the swimmers to move through the water with less resistance, therefore decreasing their fatigue and increasing their speed.

While this example has been given with respect to swimming, it is to be understood that many other uses where decrease of a moisture laden environment's resistance to movement is desired, for example, water polo, movement of a golf ball across a wet green, movement of small planes through moisture laden air, sail boat racing and hydroplaning.

When, in the above example, other aforementioned agents are employed such as sorbitan monolaurate sold under the trade mark Arlacel 20, polyoxyethylene sorbitol oleate, HLB±9.2, Atlox 1087, and polyoxyethylene sorbitol tall oil HLB±9.7, Atlox 1256, and so forth (the types and amounts of propellants varying to remain compatible, of course) are employed, substantially similar results are obtained.

While the invention has been described in connection with pressurized liquid propellants, it should be understood that it may be possible to obtain equivalent results using compressed air as the propellant.

The composition and surface active agent set forth in this example is the preferred composition and agent.

What is claimed is:

1. A composition for decreasing the interfacial surface tension as well as the contact angle between an object moving through a moisture laden environment and the moisture, thereby allowing the object to move at an increased speed with the same applied moving force or at the usual speed with less applied moving force, said composition consisting essentially of from about 5% to about 20% by weight of a non-ionic surface active agent or mixtures thereof which is water insoluble, said agent or blends of agents having an HLB of from about 7 to about 9, and from 80% to about 95% by weight of a pressurized nonflammable propellant.

2. The composition of claim 1 wherein said agent is a sorbitan fatty acid ester.

3. The composition of claim 2 wherein said agent is sorbitan monolaurate.

4. The composition of claim 1 wherein said surface active agent, or mixtures thereof, is selected from the group consisting of sorbitan fatty acid esters, polyoxyethylene sorbitol esters, polyoxyethylene alcohol ethers, polyoxyethylene mannitol dioleate esters and sorbitan mono-oleate polyoxyethylene esters of mixed fatty and resin acids.

5. A composition of claim 1 wherein the pressure of said pressurized non-flammable propellant is at a pressure within the range of from 25 psig to about 40 psig.

6. The composition of claim 6 wherein the pressure is from about 37 psig to about 40 psig.

7. The composition of claim 1 wherein said surface active agent is present at a level of from about 9% by weight to about 15% by weight and correspondingly said propellant comprises from about 85% by weight to about 91% by weight of said composition.

* * * * *